United States Patent [19]

Maggio

[11] 4,438,731
[45] Mar. 27, 1984

[54] FLOW CONTROL SYSTEM

[75] Inventor: Joseph D. Maggio, Cook County, Ill.

[73] Assignee: Mercor Corporation, Franklin Park, Ill.

[21] Appl. No.: 342,900

[22] Filed: Jan. 26, 1982

[51] Int. Cl.³ .......................................... F02M 25/02
[52] U.S. Cl. .............................. 123/25 N; 123/25 J; 123/25 E
[58] Field of Search ............... 123/25 J, 25 N, 25 E, 123/25 R, 25 A

[56] References Cited

U.S. PATENT DOCUMENTS

| 2,431,590 | 11/1947 | Smith | 123/25 E |
|---|---|---|---|
| 2,784,265 | 3/1957 | Weide | |
| 2,821,210 | 1/1958 | Liley | |
| 2,889,819 | 6/1959 | Lockheed | 123/25 N |
| 2,922,408 | 1/1960 | Humphries et al. | 123/25 N |
| 3,038,449 | 6/1962 | Murphy, Jr. et al. | |
| 3,081,942 | 3/1963 | Maclay | |
| 3,139,238 | 6/1964 | Norstrud et al. | |
| 3,300,254 | 1/1967 | Kershaw et al. | |
| 3,372,286 | 3/1968 | Rotunda | |
| 3,726,296 | 4/1973 | Friedland et al. | |
| 3,818,876 | 6/1974 | Voogd | 123/25 E |
| 3,921,599 | 11/1975 | Grow | 123/25 E |
| 4,030,523 | 6/1977 | Cram et al. | |
| 4,036,011 | 7/1977 | Gupta | |
| 4,116,610 | 9/1978 | Berthiaume | |
| 4,170,245 | 10/1979 | Haley | |
| 4,191,215 | 3/1980 | Gonner | |
| 4,335,737 | 1/1982 | Power | 123/25 E |
| 4,368,711 | 1/1983 | Allen | 123/25 N |

Primary Examiner—Ira S. Lazarus
Attorney, Agent, or Firm—Hill, Van Santen, Steadman & Simpson

[57] ABSTRACT

A flow control system for metering fluid flow in various amounts to a desired discharge point includes electrical signal responsive valves correspondingly mounted in a series of flow lines and switchable between open and close positions. An electrical control means is disclosed for selectively opening the valves individually or simultaneously in groups having relay switch means for operating each of the valves and a triggering means for selectively activating the valve relay switch means as a function of the step positions of a flow regulator device. The invention is especially useful for metering diluent fluid to an emulsification apparatus in the desired proportion as a result of the diesel engine fuel flow set by a locomotive throttle.

11 Claims, 4 Drawing Figures

FIG. 3

| RELAY | CONTACTS | STATE |
|---|---|---|
| RA | A-B | N.O. |
| RA | C-D | N.O. |
| RA | E-F | N.C. |
| RA | G-H | N.C. |
| RB | — | N.O. |
| RC | — | N.O. |
| RD | I-J | N.C. |
| RD | K-L | N.O. |
| RD | M-N | N.C. |

FIG. 4

| THROTTLE POSITION | RELAYS ENERGIZED | VALVES OPENED | FLOW RATE |
|---|---|---|---|
| 3 | RC | A | .50 |
| 4 | RA, RC | B | .75 |
| 5 | RB, RC, RD | C | 1.00 |
| 6 | RA, RB, RC, RD | A, B | 1.25 |
| 7 | RB, RC | A, C | 1.50 |
| 8 | RA, RB, RC | B, C | 1.75 |

FLOW CONTROL SYSTEM

BACKGROUND OF THE INVENTION

The invention relates to fluid flow control and more particularly to flow rate control of diluent fluid to a locomotive diesel fuel emulsifier in increment steps as a result of positioning of the locomotive engine throttle.

It is well known that train locomotives utilize diesel combustion engines, either to directly drive locomotive axles and wheels or to drive main direct current generators which then supply electric power to a plurality of traction motors connected to the locomotive axles and wheels. Locomotive speed is controlled by means of a throttle handle movable in a specified number of steps with definite indexing of the steps to regulate fuel flow to the engine. It is often desirable, as a means for achieving a more stable and more efficient combustion process in the diesel engine, to provide for emulsification of the diesel fuel with a suitable diluent fluid, such as water, prior to combustion in the diesel engine. It is generally known that fuel emulsification results in higher combustion efficiency, thereby lowering the rate of fuel consumption, and minimizes unsightly smoke formation in the combustion exhaust gases. It is also believed that certain emulsification processes can lead to a reduction of noxious combustion emissions, especially sulfer oxides.

One known fuel emulsifier presently available for use in diesel locomotives is marketed by Fuel Control Systems, Inc., of Chicago, Ill. This emulsifier provides for a mixture of water with the diesel fuel prior to combustion. A single valve controls the delivery of water flow to the emulsifier, despite the various differing fuel flow rates being used to control the locomotive diesel. As a result, the optimization curve for the emulsifier is very narrow, limited to only one or two throttle positions. This tends to reduce the practicability of the emulsifier, since for most throttle positions the water mixture amount is either too low or too high to provide the desired stabilizing effect on the combustion process.

The present invention overcomes this drawback in emulsification operation by affording automatic means for selecting various desired flow rates of diluent fluid in accordance with the relative fuel flow rates and throttle positions at hand. The flow rate control system of the present invention is not limited to use with locomotive diesel emulsifiers and further and other objects of this invention will become apparent to those reading the detailed description and drawings which follow.

SUMMARY OF THE INVENTION

Various fluid flow lines extend between a source of pressurized fluid and a common discharge point. The flow lines preferably have different throughflow areas for handling nonidentical flow rates. Each of the flow lines has contained therein a suitable on-off valve having a normally closed position. The valves are electric signal responsive, such as solenoid valves, and may be individually or simultaneously opened in various combinations to produce various, regulated fluid flow amounts to the common discharge point.

An electrical control system is provided for opening one or more of the flow valves as a function of the selective triggering of relay switches. The relay switches are arranged to provide a range of flow rates to the common discharge point from the individual opening of the valve in the smallest through flow line to the opening of substantially all the valves in all the lines for a maximum flow rate amount.

In accordance with the preferred embodiment, the fluid flow lines serve to conduct water under pressure to a locomotive diesel emulsifier. The electrical control system is connected to a conventional locomotive throttle such that, as engine throttle speed is indexed upward, larger flow lines are opened on an individual basis and incrementally combined flow lines are opened until the maximum water flow rate is achieved matched with the appropriate maximum fuel flow in the emulsifier set by the throttle. The electrical control system relays are respectively connected in parallel with the fuel governor relays in the throttle to achieve simultaneous regulation of fuel and water flow to the emulsifier in the desired proportion. As a result, emulsifier operation has a wide optimization curve and is very practicable for use in locomotive diesel systems.

BRIEF DESCRIPTION OF THE DRAWING

FIG. 3 is a relay chart illustrating the rest states for the relays in the electrical circuit of FIG. 2.

FIG. 4 is a relay and valve chart illustrating operation of the flow control system of the present invention as a function of locomotive throttle positions.

DESCRIPTION OF THE PREFERRED EMBODIMENT

The preferred embodiment is directed to use of the present invention for optimizing operation of a locomotive diesel emulsifier. However, those skilled in the art will readily appreciate that the flow rate controller of the present invention will have other applications, such as in directly regulating a fluid flow delivery or in generally supplying a diluent fluid in varying amounts depending upon the set flow rate of the fluid being diluted.

Figure 1:
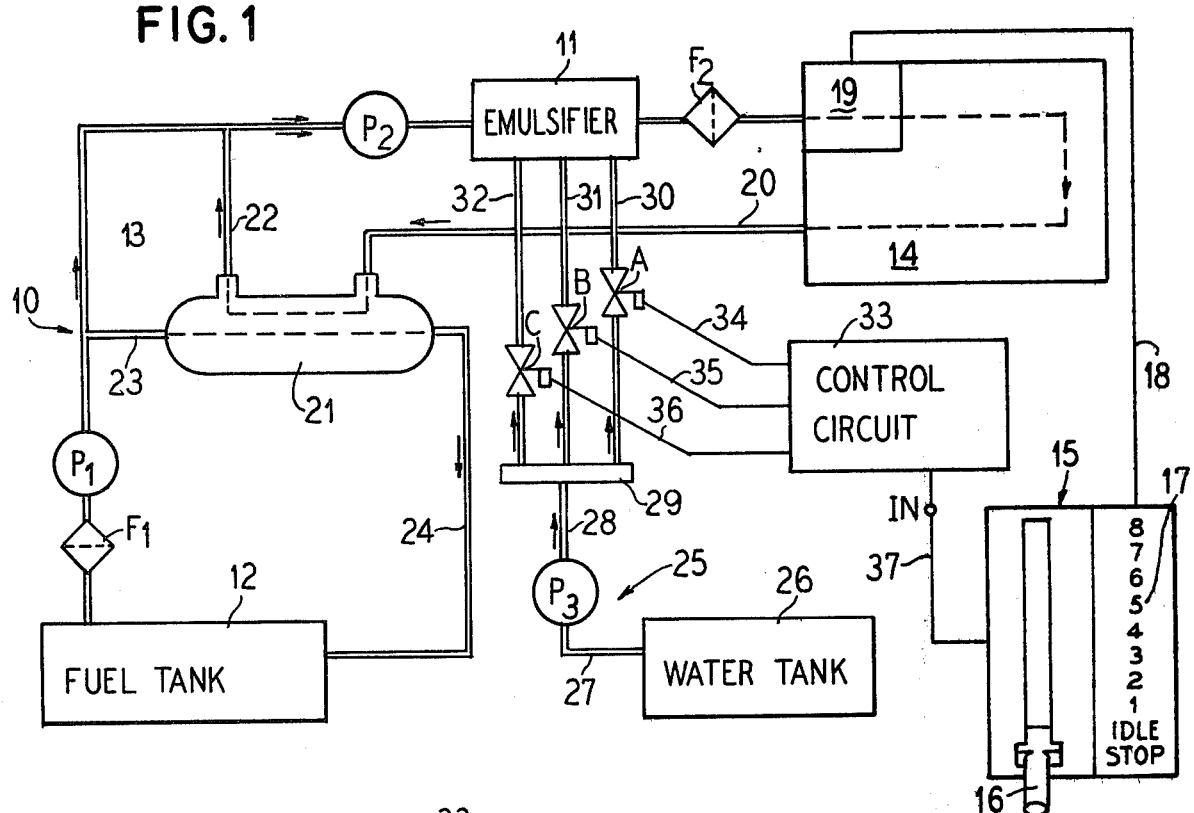
FIG. 1 is a schematic diagram illustrating the principal and operation of the flow control system of the present invention in connection with a locomotive diesel emulsifier system.

FIG. 1 illustrates a locomotive diesel system 10 having a fuel emulsifier 11 of a type presently manufactured by Fuel Control Systems, Inc., of Chicago, Ill. A conventional fuel tank 12 containing a supply of liquid diesel fuel is connected to the emulsifier 11 through a flow line 13. The flow line 13 contains suitable filter means F1 and F2 and pumps P1 and P2 through which liquid fuel is conveyed under pressure from the tank 12 to a locomotive diesel engine 14.

The locomotive system 10 also includes an engine throttle device 15 having a manually operated throttle handle 16 movable between a definite number of step positions 17 with indexing of the steps to control the amount of fuel flow to the engine 14 and consequently locomotive speed. These steps 17 are limited in number and include, in the well-known manner, stop and idle positions and eight throttle speed positions. Movement of the throttle handle 16 turns a cam drum (not shown) which operates a stack of cam follower switches in various combinations by means of suitable interacting surfaces for selectively activating corresponding fuel governors through a suitable circuit connection 18. The fuel governors are electric signal responsive and located in a governor assembly 19 along the fuel line within the diesel engine 14. Suitable fuel governors are opened, depending on the respective step position of the throttle handle 16, to regulate the amount of fuel to the engine cylinders. Electric control of the fuel governors for a locomotive diesel engine by means of the throttle device 15 is conventional in the locomotive art, such as disclosed in U.S. Pat. No. 2,784,265.

A recirculation fuel line 20 returns a bypass fuel flow from the engine 14 under pump pressure through a heat exchanger 21. The cooled fuel passes through line 22 back into main flow line 13. A portion of the main fuel flow is conducted through a bypass flow line 23 through the heat exchanger 21 in parallel heat exchange with the recirculation flow passing through line 20 and back to the fuel tank 12 through return line 24.

The emulsifier 11 serves to add water to the liquid fuel passing to the diesel engine 14 in a known manner for achieving a more stable and more efficient combustion process in the diesel engine. The present invention concerns a system for automatically regulating the amount of water with which the liquid fuel is diluted passing into the emulsifier 11 in accordance with the instant fuel flow to the engine as set by the throttle 15. In accordance with the invention, a water supply means 25 is provided, including a tank 26 containing a supply of water for the emulsifier fluid connected by conduit 27 to a suitable pump P3. The water under pressure then passes through a conduit 28 to an inlet manifold 29.

Extending between the inlet manifold and the emulsifier 11, which serves as a common terminus point for their respective water flows, are a series of individual flow lines 30, 31, and 32 of differing throughflow areas. For purposes of illustration, three individual water flow lines are depicted, although more or less may be used, and line 30 is formed by a conduit having the relatively smallest cross-sectional flow area, line 31 the intermediate throughflow conduit area, and line 32 the largest cross-sectional flow area conduit. Accordingly, flows of equal pressure through each of the three conduits 30–32 would result in flow line 32 having the highest flow rate, with line 31 second, and line 30 having the smallest flow rate.

A plurality of electric signal responsive valves A, B, and C, such as electromagnet solenoid valves, are respectively mounted in each of the flow lines 30, 31, and 32. These valves may be, in accordance with the preferred embodiment, one-way on-off valves normally disposed in the closed position. Selective opening of these valves A, B, and C individually or simultaneously in groups serves to regulate the total amount of water flow delivery to the emulsifier 11. The arrangement of the valves in flow lines of differing throughflow areas serves to provide a step increase progression in the total amount of water flow being delivered by the water supply means 25. For purposes of illustration, flow line 30 with valve A opened may, for example, deliver a flow rate from the inlet manifold 29 which is one-half of the flow rate through line 32 with valve C opened and line 31 with valve B opened may deliver a flow rate which is three-fourths of the flow through open line 32. Other flow rate ratios may be employed to meet individual requirements without departing from the inventive concept disclosed herein.

The selective opening of one or more of the valves A, B, and C is controlled by an inventive control circuit 33 which supplies signals via electric signal connections 34, 35, and 36 to the respective solenoid valves A, B, and C. The signals supplied by the control circuit 33 are generated as a known function of the standard step positions of the throttle handle 16. A control circuit input line 37 connected to an input terminal IN schematically illustrates the interconnection of the control circuit 33 with the throttle handle 16. The input line 37 consists of multiple insulated conductors for respectively energizing one or more of the governor solenoids shown in FIG. 2, as described in greater detail below. For purposes of illustration, the invention will be described so that the valves A, B, and C are triggered accordingly in response to throttle step positions 3-8, although it will be appreciated that the control circuit may operate as a function of more or less throttle positions.

For efficient and practicable operation of the emulsifier, water is added to the diesel fuel at a fixed or narrow range rate, such as five to eight percent, by weight of liquid fuel being passed into the emulsifier at any particular stage of engine operation as set by the throttle 15. This quantity of water is adequate to aid the emulsification of the diesel fuel for delivery to the engine through the fuel line 13.

Figure 2:
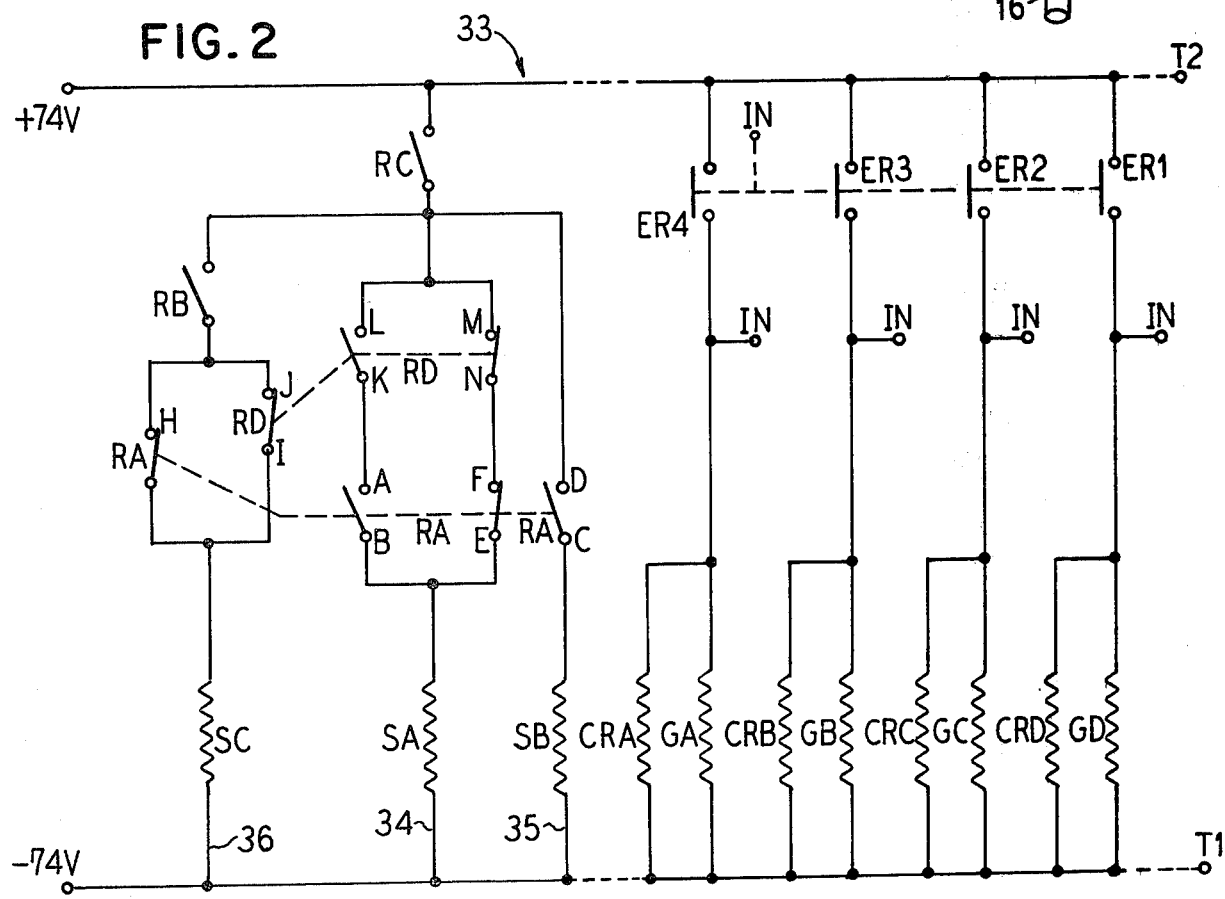
FIG. 2 is an electrical circuit diagram showing the flow control system of the present invention for use in connection with a locomotive throttle.

A simplified circuit diagram for the control circuit 33 is shown in FIG. 2. Only those components related to the subject matter disclosed herein are shown in FIG. 2, and it will be understood that various other components may be embodied within the control circuit for controlling and/or monitoring other operating parameters of the diesel engine. Such other components may, for example, be connected between terminals T1 and T2. The control circuit 33 is connected to positive and negative operating voltages which may, for example, be ±74 V.

A plurality of governor relays are present in conventional diesel engine operating circuitry which are controlled by moving the throttle handle 16 of the throttle device 15 to one of the throttle step positions 17. Depending upon the position of the throttle handle 16, signals will be generated on one or more of the individual conductors of the input line 37 so as to energize one or more of the governor relays. The respective coils for the governor relays are represented as resistances GA, GB, GC and GD in FIG. 2. Each such coil is connected to the control circuit input IN where connection is made to one or more of the individual conductors in the control circuit input line 37. In a conventional diesel engine electrical system, moving the throttle lever 16 to position 3 energizes the coil GC, position 4 energizes coils GA and GC, position 5 energizes coils GB, GC and GD, position 6 energizes coils GA, GB, GC and GD, position 7 energizes coils GB and GC, and position 8 energizes coils GA, GB and GC.

In addition, each governor relay circuit has a normally open safety switch, respectively labelled ER1, ER2, ER3 and ER4. These switches are all simultaneously closed by a signal supplied by the input line 37 to the terminal IN whenever the throttle lever 16 is moved to one of the 8 engine run positions. This insures that none of the governor relays will be accidentally energized when the lever 16 is in a stop or idle position.

In accordance with the principles of the present invention, four relays RA, RB, RC and RD are employed for controlling the solenoid valves A, B and C. The coils for those solenoid valves are shown as resistances in FIG. 2 respectively labelled SA, SB and SC. The coils for the control relays RA, RB, RC and RD are shown as resistances in FIG. 2 respectively labelled CRA, CRB, CRC and CRD. Each control relay coil is connected in parallel with one governor relay coil so that it will be energized simultaneously with that governor relay coil. In accordance with the standard governor relay energization sequence described above, the control relays are energized as shown in FIG. 4 in accordance with the throttle positions 3 through 8.

The rest positions of the various contacts of the control relays are shown in FIG. 3, which correspond to the positions as drawn in FIG. 2. As can be seen in FIG. 2, in the rest state when no relay is energized, current is not supplied to any of the coils SA, SB and SC for the solenoid valves A, B and C, so that none of the valves are opened and no water is supplied to the emulsifier 11. If the lever 16 is moved to throttle position 3, for example, governor relay coil GC and control relay coil CRC are energized so that relay RC closes while the other relays remain in their respective rest states so that current is supplied to the coil SA for the solenoid valve A via relay RC and contacts M, N of relay RD and contacts F, E of relay RA. In accordance with the description above, it is assumed that valve C operating alone provides a flow rate of unity and the various flow rates which can be obtained by the combination of valves A, B and C is shown in FIG. 4. Accordingly, when the lever 16 is in throttle position 3 a flow rate of 0.50 is obtained.

In throttle position 4, relay coils CRA and CRC for relays RA and RC are energized so that current flows only to coil SB via relay RC and to contacts D, C of relay RA so that only solenoid valve B is opened and a flow rate of 0.75 is obtained.

In throttle position 5, relays RB, RC and RD are energized so that current flows to coil SC via relay RC, relay RE, and contacts H, G of relay RA so that a flow rate of unity is obtained.

In throttle position 6, all four of the relays are energized so that current flows only to coil SA via relay RC, contacts L, K of relay RD and contacts A, B of relay RA, and to coil SB via relay RC and contacts D, C of relay RA. By adding the flow rates for the individual valves A and B, a flow rate of 1.25 is obtained.

In throttle position 7, relays RB and RC are energized so that current flows only to coil SA via relay RC, contacts M, N of relay RD and contacts F, E of relay RA and to coil SC via relay RC, relay RB and contacts H, G of relay RA and contacts J, I of relay RD so that valves A and C are opened for a flow rate of 1.50.

Finally, in throttle position 8, relays RA, RB and RC are energized so that current flows only to coil SB via relay RC and contacts D, C of relay RA and to coil SC via relay RC, relay RB and contacts J, I of relay RD so that valves B and C are opened for a flow rate of 1.75.

Although the various component values may be selected in a manner known to those skilled in the relevant technology in order to satisfy particular conditions, an exemplary embodiment of the circuit shown in FIG. 2 can be realized wherein relay RA is a type 8155259 relay with a coil resistance of approximately 2000 ohms, relay RB and RC are type 8363168 relays having a coil resistance of approximately 1128 ohms and relay RD is a type 8357415 relay having a coil resistance also of 1128 ohms, and wherein valves A, B and C are solenoid valves having coil resistances of 375 ohms.

The described embodiment of the invention is only considered to be preferred and illustrative of the inventive concept. The scope of the invention is not to be restricted to such embodiment. Various and numerous other arrangements may be devised by one skilled in the art without departing from the spirit and scope of this invention. For example, it would be possible to utilize the flow rate control system of the present invention to meter a predetermined fluid flow in various amounts to a desired discharge point for mixing with a further fluid flow being delivered in different amounts at different times for a wide variety of applications, such as for diluting gas in preparation of a calibration curve in gas analysis. In such other applications, the control circuit of the present invention would be triggered as a function of changes in the control device setting the amount of main fluid flow so that the diluent fluid flow amount could be correspondingly changed automatically. Thus, the desired proportion of main and diluent fluids is maintained irregardless of changes in the main fluid flow rate. In addition, a single valve in a single flow line may be used in accordance with the present invention for varying the rate of flow of a fluid having progressive energized states corresponding to wider flow openings through the valve. It should be understood that I wish to embody within the scope of the patent warranted hereon all such modifications as reasonably and properly come within the scope of my contribution to the art.

I claim as my invention:

1. An improved fuel delivery system for a locomotive diesel engine having a source of fuel under pressure, a first flow means for delivering fuel at varying rates to said engine, a fuel emulsifier incorporated in said first flow means for mixing a diluent fluid with said fuel upstream of said engine, a source of diluent fluid under pressure, a second flow means for delivering diluent fluid to said emulsifier, and a throttle means having a series of step positions for setting different fuel rates through said first flow means, the improvement comprising:

selectively controllable valve means in said second flow means for regulating the flow rate of diluent fluid therethrough and control means for activaing said valve means as a function of the step position of said throttle means such that a predetermined desired mixture proportion of diluent fluid and fuel is respectively achieved in said emulsifier for particular fuel flow rates set by said throttle means.

2. The improvement of claim 1, wherein said valve means comprise a plurality of individual flow lines connected between a common inlet and common terminus in said second flow means, said flow lines having differing throughflow areas and corresponding individual valves.

3. The improvement of claim 2, wherein said control means activates said valves individually and in combination.

4. The improvement of claim 3, wherein said valves are electrical signal responsive and said control means includes an electrical circuit with a plurality of relays respectively connected to said valves for opening selected ones of said valves when selected ones of said relays are energized and a means for selectively energizing said relays.

5. The improvement of claim 4, wherein said diesel engine includes a plurality of governor solenoids and wherein each of said relays has a coil, said relay coils being respectively connected in parallel with said governor solenoids.

6. An improved emulsification system for a combustor burning liquid fuel including a source of fuel under pressure, a first first flow means for delivering fuel to said combustor, an emulsifier means incorporated in said first flow means for mixing a diluent fluid with said fuel upstream of said combustor, a source of diluent fluid under pressure, a second flow means for delivering diluent fluid to said emulsifier, and a throttle means having a series of step positions for varying the flow rate of fuel in said first flow means, the improvement comprising:

- a plurality of individual flow lines connected between a common inlet and common terminus in said second flow means, said flow lines having differing throughflow areas,
- a plurality of valves correspondingly mounted in each flow line, and
- control means for sselectively opening said valves including triggering means for opening said valves as a function of the step positions of said throttle means such that a predetermined desired mixture proportion of diluent fluid and fuel is respectively achieved in said emulsifier for particular fuel flow rates set by said throttle means.

7. The improvement of claim 6, wherein said diluent fluid is water.

8. The improvement of claim 6, wherein said valves are electrical signal responsive on-off valves and said control means is an electric circuit having relays respectively connected to said valves and selectively activated by said triggering means for opening and closing said valves.

9. The improvement of claim 6, wherein said control means selectively opens said valves individually.

10. The improvement of claim 6, wherein said control means selectively opens said valves simultaneously in predetermined groups.

11. A process for regulating delivery of diluent fluid to a fuel emulsifier for a combustion engine having a throttle means having a series of step positions for setting varying flow rates of fuel through said emulsifier to said engine, comprising:

- connecting a source of diluent fluid under pressure in a fluid path to said emulsifier,
- providing selectively controllable valve means in said fluid path for regulating the flow rate of diluent fluid therethrough, and
- activating said valve means as a function of the step positions of said throttle means such that a predetermined desired mixture proportion of diluent fluid and fuel is respectively achieved in said emulsifier for particular fuel flow rates set by said throttle means.

* * * * *